United States Patent
Yin et al.

(10) Patent No.: US 8,819,318 B2
(45) Date of Patent: Aug. 26, 2014

(54) SYSTEM AND METHOD FOR SWITCHING USE OF SERIAL PORT

(75) Inventors: Ji-Zhi Yin, Shenzhen (CN); Wen-Chong Tu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 555 days.

(21) Appl. No.: 13/192,479

(22) Filed: Jul. 28, 2011

(65) Prior Publication Data

US 2012/0159035 A1 Jun. 21, 2012

(30) Foreign Application Priority Data

Dec. 15, 2010 (CN) .......................... 2010 1 0589290

(51) Int. Cl.
*G06F 13/00* (2006.01)

(52) U.S. Cl.
USPC .......................................... 710/100; 710/316

(58) Field of Classification Search
CPC ... G06F 13/38; G06F 13/4022; G06F 13/385; G06F 3/0601; G06F 3/0635; G06F 3/0689
USPC ................................................. 710/100, 316
See application file for complete search history.

(56) References Cited

U.S. PATENT DOCUMENTS

| | | | |
|---|---|---|---|
| 2007/0088988 A1 * | 4/2007 | Gupta et al. | 714/48 |
| 2008/0282075 A1 * | 11/2008 | Hsu et al. | 713/1 |
| 2008/0288764 A1 * | 11/2008 | Lu | 713/2 |
| 2009/0234999 A1 * | 9/2009 | Huang et al. | 710/110 |
| 2010/0017630 A1 * | 1/2010 | Chen et al. | 713/300 |
| 2010/0125752 A1 * | 5/2010 | Chen et al. | 714/6 |
| 2010/0332707 A1 * | 12/2010 | Jayakumar | 710/107 |
| 2011/0231639 A1 * | 9/2011 | Chien | 713/2 |
| 2012/0005494 A1 * | 1/2012 | Peng | 713/300 |
| 2012/0079260 A1 * | 3/2012 | Yin et al. | 713/2 |
| 2012/0144180 A1 * | 6/2012 | Tang | 713/2 |

FOREIGN PATENT DOCUMENTS

| | | | | |
|---|---|---|---|---|
| CN | 101661453 B | * | 4/2011 | ............. G06F 13/40 |
| CN | 102147640 A | * | 8/2011 | ............... G06F 1/16 |
| CN | 103049282 A | * | 4/2013 | ............. G06F 9/445 |

* cited by examiner

*Primary Examiner* — Faisal M Zaman
(74) *Attorney, Agent, or Firm* — Novak Druce Connolly Bove + Quigg LLP

(57) ABSTRACT

A baseboard management controller (BMC) of a server includes a general purpose input output (GPIO) pin. An voltage level of the GPIO level determines if a BIOS of the server or the BMC uses a serial port of the server. If the BMC wants to use the serial port and the voltage level of the GPIO pin is at a high level, the serial port can be used by the BMC. If the BMC wants to use the serial port but the voltage level of the GPIO pin is not at the high level, the serial port is be used by the BIOS. If the BIOS has been initialized, the voltage level of the GPIO pin is pulled up.

9 Claims, 3 Drawing Sheets

SYSTEM AND METHOD FOR SWITCHING USE OF SERIAL PORT

BACKGROUND

1. Technical Field

Embodiments of the present disclosure generally relate to serial port management, and more particularly to a system and method for switching use of a serial port.

2. Description of Related Art

A serial port of a server can be used by a baseboard management controller (BMC) and a basic input output system (BIOS) of the server. The BMC or the BIOS uses the serial port by switching a multiplexer (MUX) of the server. If the BIOS has not been initialized and the BMC requests to use the serial port, the initialization of the BIOS has to be suspended until the BMC has used the serial port. The suspension of the initialization of the BIOS may degrade stability of the server.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
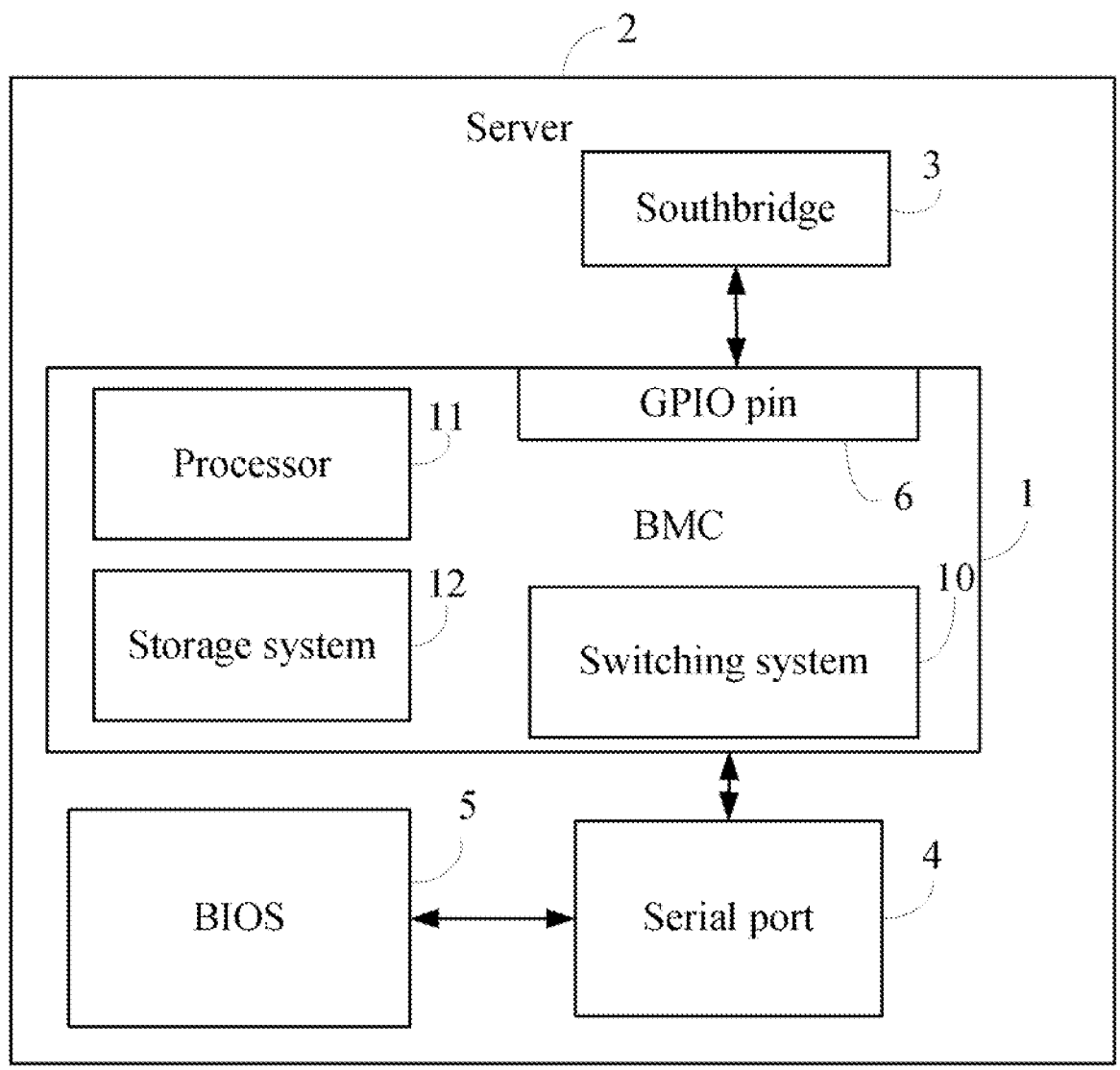
FIG. 1 is a block diagram of one embodiment of a server.

FIG. 1 is a block diagram of one embodiment of a server 2. The server 2 includes a baseboard management controller (BMC) 1, a southbridge 3, a serial port 4, and a basic input output system (BIOS) 5. The BMC 1 includes a switching system 10. The BMC 1 connects with the southbridge 3 via a general purpose input output (GPIO) pin 6. The switching system 10 is used to control the BMC 1 or the BIOS 5 to use the serial port 4 to send or receive data.

The switching system 10 controls a voltage level of the GPIO pin 6. For example, if the server 2 is powered on, the voltage level of the GPIO pin 6 is set to a high level by the switching system 10. If the BIOS 5 is being initialized, the voltage level of the GPIO pin 6 is set to a low level by the switching system 10. In some embodiments, the high level may be logic 1, and the low level may be logic 0. After the BIOS 5 has been initialized, the GPIO pin 6 is pulled up back to the high level. If the BMC 1 sends data to the serial port 4, namely the BMC 1 uses the serial port 4, the voltage level of the GPIO pin 6 will be pulled up to the high level.

In an exemplary embodiment, the BMC 1 includes at least one processor 11 and a storage system 12. The switching system 10 may include one or more modules. The one or more modules may comprise computerized code in the form of one or more programs that are stored in the storage system 12. In one embodiment, the storage system 12 may be a cache or a memory, such as an EPROM or a flash, or other suitable storage medium. The computerized code includes instructions that are executed by the at least one processor 11 to provide functions for the one or more modules.

Figure 2:
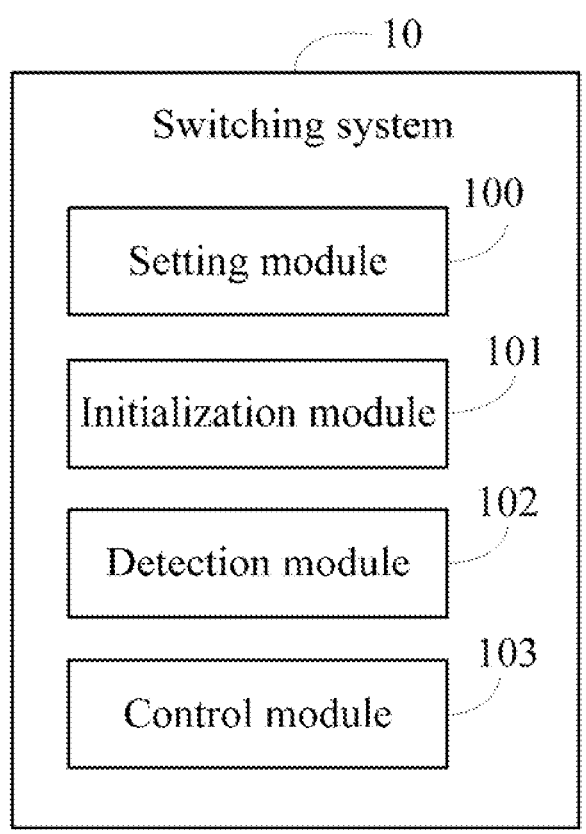
FIG. 2 is a block diagram of one embodiment of the function modules of a switching system in FIG. 1.

As shown in FIG. 2, the switching system 10 may include a setting module 100, an initialization module 101, a detection module 102, and a control module 103.

If the server 2 is powered on, the setting module 100 sets the voltage level of the GPIO pin 6 to the high level.

The initialization module 101 initializes the BIOS 5, and pulls down the voltage level of the GPIO pin 6 to the low level, and the BIOS 5 uses the serial port 4.

The detection module 102 detects if the BMC 1 requests to use the serial port 4. In one embodiment, the BMC 1 may request to use the serial port 4 by sending a request command to the serial port 4. The request command may be a request to send or receive data using the serial port 4. If the BMC 1 requests to use the serial port 4, the detection module 102 detects if the voltage level of the GPIO pin 6 is high. If the voltage level of the GPIO pin 6 is high, meaning the BIOS is not currently using the serial port 4, the control module 103 controls the BMC 1 to use the serial port 4.

If currently there is no request from the BMC 1 to use the serial port 4, or if the BMC 1 requests to use the serial port 4 and the voltage level of the GPIO PIN 6 is low, meaning the serial port 4 is currently switched for use by the BIOS 5, or if the serial port 4 is currently switched for use by the BMC 1 but the BMC 1 no longer needs the serial port 4, the detection module 102 detects if the initialization of the BIOS 5 has been completed. If initialization of the BIOS 5 has not been completed, the initialization module 101 continues initializing the BIOS 5. If the BIOS 5 has been initialized, the control module 103 pulls up the voltage level of the GPIO pin 6.

Figure 3:
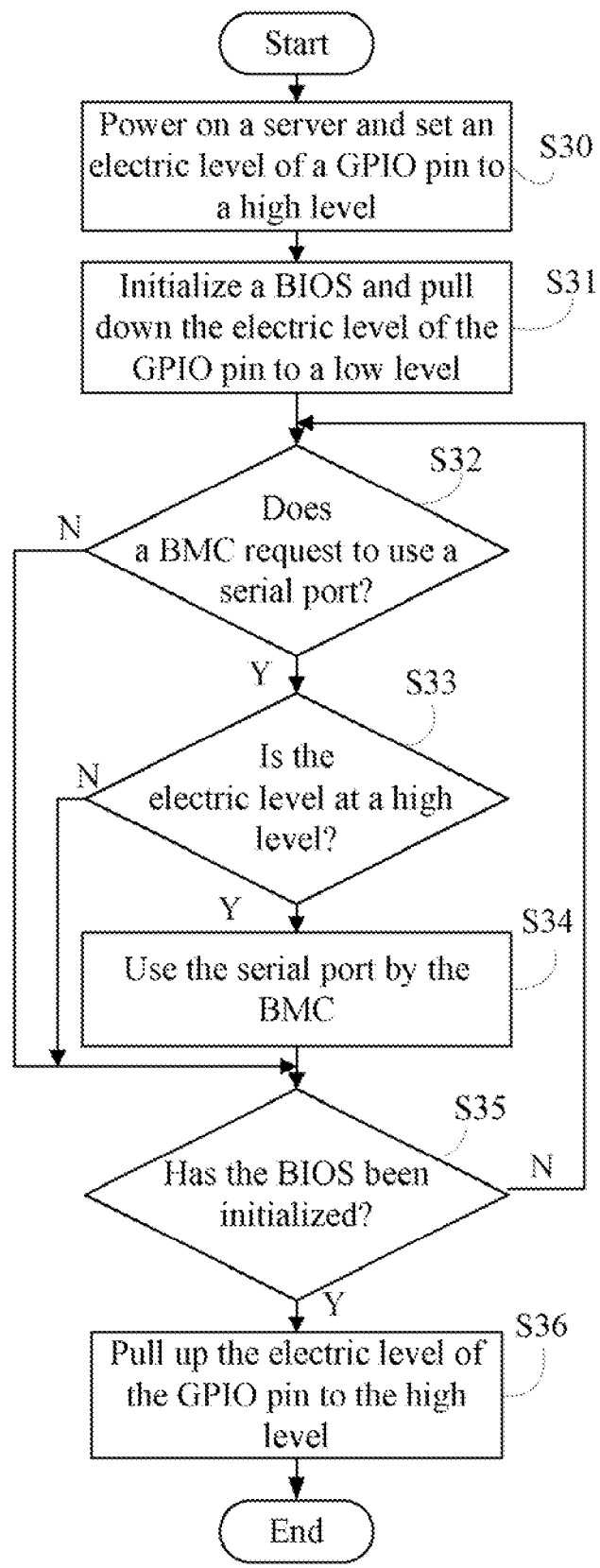
FIG. 3 is a flowchart illustrating one embodiment of a method for switching use of a serial port.

FIG. 3 is a flowchart illustrating a method for switching use a serial port. Depending on the embodiment, additional blocks may be added, others removed, and the ordering of the blocks may be changed.

In block S30, if the server 2 is powered on, the setting module 100 sets the voltage level of the GPIO pin 6 to the high level.

In block S31, the initialization module 101 initializes the BIOS 5, and pull down the voltage level of the GPIO pin 6 to the low level.

In block S32, the detection module 102 detects if the BMC 1 requests to use the serial port 4. If the BMC 1 requests to use the serial port 4, block S33 is implemented. If the BMC 1 does not requests to use the serial port 4, block S35 is implemented.

In block S33, the detection module 102 detects if the voltage level of the GPIO pin 6 is at the high level. If the voltage level of the GPIO pin 6 is at the high level, block S34 is implemented. If voltage level of the GPIO pin 6 is not at the high level, block S35 is implemented.

In block S34, the control module 103 controls the BMC 1 to use the serial port 4. If the BMC 1 has used the serial port 4, block S35 is implemented.

In block S35, the detection module 102 detects if the BIOS 5 has been initialized. If the BIOS 5 has been initialized, block S36 is implemented. If the BIOS 5 has not been initialized, block S32 is repeated.

In block S36, the control module 103 pulls up the voltage level of the GPIO pin 6 to the high level.

Although certain inventive embodiments of the present disclosure have been specifically described, the present disclosure is not to be construed as being limited thereto. Various changes or modifications may be made to the present disclosure beyond departing from the scope and spirit of the present disclosure.

What is claimed is:

1. A baseboard management controller (BMC) for a server, comprising:
   a storage system;
   at least one processor; and
   one or more programs being stored in the storage system and executable by the at least one processor, the one or more programs comprising:
      a setting module operable to set an voltage level of a general purpose input output (GPIO) pin of the BMC to a high level if the server is powered on;
      an initialization module operable to initialize a BIOS of the server, and pull down the voltage level of the GPIO pin to a low level, wherein a serial port of the server is used by the BIOS;
      a control module operable to control the BMC to use the serial port if the BMC requests to use the serial port and the voltage level of the GPIO pin is at a high level; and
      the control module further operable to pull up the voltage level of the GPIO pin to the high level if the BMC does not request to use the serial port and the BIOS has been initialized.

2. The BMC as described in claim 1, wherein the serial port is used by the BIOS if the BMC requests to use the serial port and the voltage level of the GPIO pin is not at the high level.

3. The BMC as described in claim 1, wherein the serial port is used to send or receive data.

4. A method for switching use of a serial port of a server, comprising:
   setting an voltage level of a general purpose input output (GPIO) pin of a baseboard management controller (BMC) of the server to a high level if the server is powered on;
   initializing a BIOS of the server, and pulling down the voltage level of the GPIO pin to a low level, wherein the serial port is used by the BIOS;
   controlling the BMC to use the serial port if the BMC requests to use the serial port and the voltage level of the GPIO pin is at a high level; and
   pulling up the voltage level of the GPIO pin to the high level if the BMC does not request to use the serial port and the BIOS has been initialized.

5. The method as described in claim 4, wherein the serial port is used by the BIOS if the BMC requests to use the serial port and the voltage level of the GPIO pin is not at the high level.

6. The method as described in claim 4, wherein the serial port is used to send or receive data.

7. A non-transitory storage medium having stored thereon instructions that, when executed by a processor, cause the processor to perform a method for switching use of a serial port of a server, the method comprising:
   setting an voltage level of a general purpose input output (GPIO) pin of a baseboard management controller (BMC) to a high level if the server is powered on;
   initializing a BIOS of the server, and pulling down the voltage level of the GPIO pin to a low level, wherein the serial port is used by the BIOS;
   controlling the BMC to use the serial port if the BMC requests to use the serial port and the voltage level of the GPIO pin is at a high level; and
   pulling up the voltage level of the GPIO pin to the high level if the BMC does not request to use the serial port and the BIOS has been initialized.

8. The non-transitory storage medium as described in claim 7, wherein the serial port is used by the BIOS if the BMC requests to use the serial port and the voltage level of the GPIO pin is not at the high level.

9. The non-transitory storage medium as described in claim 7, wherein the serial port is used to send or receive data.

* * * * *